United States Patent [19]
Bakke et al.

[11] Patent Number: 5,765,204
[45] Date of Patent: Jun. 9, 1998

[54] METHOD AND APPARATUS FOR ADAPTIVE LOCALIZATION OF FREQUENTLY ACCESSED, RANDOMLY ADDRESSED DATA

[75] Inventors: Brian Eric Bakke; Frederic Lawrence Huss; Daniel Frank Moertl; Bruce Marshall Walk, all of Rochester, Minn.

[73] Assignee: International Business Machines Corporation, Armonk, N.Y.

[21] Appl. No.: 658,546

[22] Filed: Jun. 5, 1996

[51] Int. Cl.⁶ .................................................. G06F 12/06
[52] U.S. Cl. ........................... 711/202; 711/112; 711/160
[58] Field of Search ................................. 711/112, 118, 711/133–136, 159, 160, 170, 173, 165, 201, 202, 206–209

[56] References Cited

U.S. PATENT DOCUMENTS

| | | | |
|---|---|---|---|
| 4,435,752 | 3/1984 | Winkelman | 395/621 |
| 4,680,703 | 7/1987 | Kriz | 711/112 |
| 5,021,946 | 6/1991 | Korty | 395/621 |
| 5,390,327 | 2/1995 | Lubbers et al. | 395/182.05 |
| 5,440,686 | 8/1995 | Dahman et al. | 395/164 |
| 5,581,736 | 12/1996 | Smith | 711/170 |
| 5,584,018 | 12/1996 | Kamiyama | 711/165 |
| 5,664,187 | 9/1997 | Burkes et al. | 395/621 |

FOREIGN PATENT DOCUMENTS 57-207969  12/1982  Japan .

OTHER PUBLICATIONS

Ford et al., Optimizing random retrievals from CLV format optical disks, Proceedings of the Seventeenth International Conference on Very Large Data Bases, pp. 413–422, Sep. 1991.

Akyuerek et al., Adaptive disk management, Mayland Univ., College Park, MD, Ph.D. Thesis, Report No. NIPS-96-33219, 200 p., Jan. 1994.

*Primary Examiner*—Matthew M. Kim
*Attorney, Agent, or Firm*—Joan Pennington

[57] ABSTRACT

A method and apparatus are provided for adaptive localization of frequently accessed, randomly addressed data in a direct access storage device (DASD) to achieve improved system access performance. At selected sampling intervals, a DASD storage controller analyzes data access patterns based on frequency of access, identifies a remapping algorithm to remap the logical groups to physical groups, and moves the physical groups according to the identified remapping algorithm. The data reordering on the DASD provides frequently accessed data in close proximity so that seek time is minimized. The adaptive data localization method periodically performed by the storage controller is transparent to the host file system. The reordering of the data on the DASD is performed during periods of low system data transfer activity.

22 Claims, 8 Drawing Sheets

CONTROL STRUCTURES 204

GLOBAL PARAMETERS 206

GT_CNT 210
GP_CNT 212
GSF 214
GER 216
GMC 218
GLM_MIN 220

LOGICAL GROUP PARAMETERS 208

LH_CNT 222
LP_CNT 224

FIG.3D  DECREASING ACCESS FREQUENCY

FIG.3E  ACCESSED TOGETHER    ACCESSED TOGETHER

METHOD AND APPARATUS FOR ADAPTIVE LOCALIZATION OF FREQUENTLY ACCESSED, RANDOMLY ADDRESSED DATA

FIELD OF THE INVENTION

The present invention relates to a method and apparatus for adaptive localization of frequently accessed, randomly addressed data in a direct access storage device (DASD) using fixed block architecture (FEBA) to improve system read/write performance.

DESCRIPTION OF THE PRIOR ART

Computers often include auxiliary memory storage units having media on which data can be written and from which data can be read. Disk drive units or DASDs, often incorporating stacked, commonly rotated rigid magnetic disks, are used for storage of data in magnetic form on the disk surfaces. Data is recorded in radially spaced data information tracks arrayed on the surfaces of the disks. Transducer heads driven in a path toward and away from the drive axis write data to the disks and read data from the disks. A data cylinder includes a set of corresponding data information tracks for the stack of disk surfaces. In a DASD using fixed block architecture (FBA), the data information tracks are divided into equally sized segments or sectors. Each sector is assigned a number or logical block address (LBA).

Typically data is created at random times, stored at random DASD locations, and later accessed by the system. Not all data is accessed with the same frequency. Certain data is frequently accessed while other data is rarely accessed or never accessed in the case of the file system deallocating the data. The future access characteristics of the data are not known at the time the DASD location of the data is assigned. As a result, frequently accessed data and infrequently accessed data typically are physically intermixed on the DASD.

Data access time includes seek time for moving the transducer heads from the current disk position to a target radial position, rotational latency time, and data transfer time. To improve system read/write performance, it is desirable to minimize the seek length or distance the transducer heads must be moved in a data access operation. An average seek length is usually defined as ⅓ of a disk. Significant system read/write performance improvement would be provided, for example, by reducing the seek length to half the present average seek or ⅙ of a disk.

U.S. Pat. No. 4,680,703, issued Jul. 14, 1987 to the present assignee discloses a data processing system arranged for reorganizing the pages on a disk to reduce the motion of the disk read-write head for a seek operation to reduce track seek time. The disclosed data reordering method is based on the assumption that data will be fetched from the disk in the same order as previously fetched. A list is kept of the disk seek times of each page in main memory, and is updated when a new page is brought into memory. During one system operational mode or phase, the average of the disk seek times is calculated and compared with a reference value. The reference value is a preselected threshold value used to initiate a second system operational phase where pages are reordered on the disk. In the second phase pages are reordered on the disk as they are bumped from memory. A list is kept of all pages in memory, and pages are selected from the list until each page originally in memory has been rewritten onto a track that may be more advantageously located for a subsequent fetch operation on the same page. The operation then returns to the first phase.

SUMMARY OF THE INVENTION

Important objects of the present invention are to provide an improved method and apparatus for adaptive localization of frequently accessed, randomly addressed data in a direct access storage device (DASD); to provide such method and apparatus that provides improved system access performance of data transfers to and from the DASD; and to provide such method and apparatus that overcomes many of the disadvantages of prior art arrangements.

In brief, a method and apparatus are provided for adaptive localization of frequently accessed, randomly addressed data in a direct access storage device (DASD). Frequency of access is identified to a plurality of logical groups during a sampling interval. The logical groups are mapped to physical groups in the direct access storage device (DASD). A localization point is selected in the direct access storage device (DASD) and the plurality of logical groups are sorted based on the identified frequency of access. A new optimized logical group to physical group map is created based on the sorted plurality of logical groups. A delta map between a current logical group to physical group map and the new optimized logical group to physical group map is created. A number of logical groups in the delta map are moved to new physical groups.

BRIEF DESCRIPTION OF THE DRAWINGS

The present invention together with the above and other objects and advantages may best be understood from the following detailed description of the preferred embodiments of the invention illustrated in the drawings, wherein:

FIGS. 3D–3I are block diagram illustrating alternative DASD remapping criteria selected by a storage controller of FIG. 1 used with the adaptive localization method for frequently accessed, randomly addressed data in accordance with the present invention;

DETAILED DESCRIPTION OF THE PREFERRED EMBODIMENTS

Figure 1:
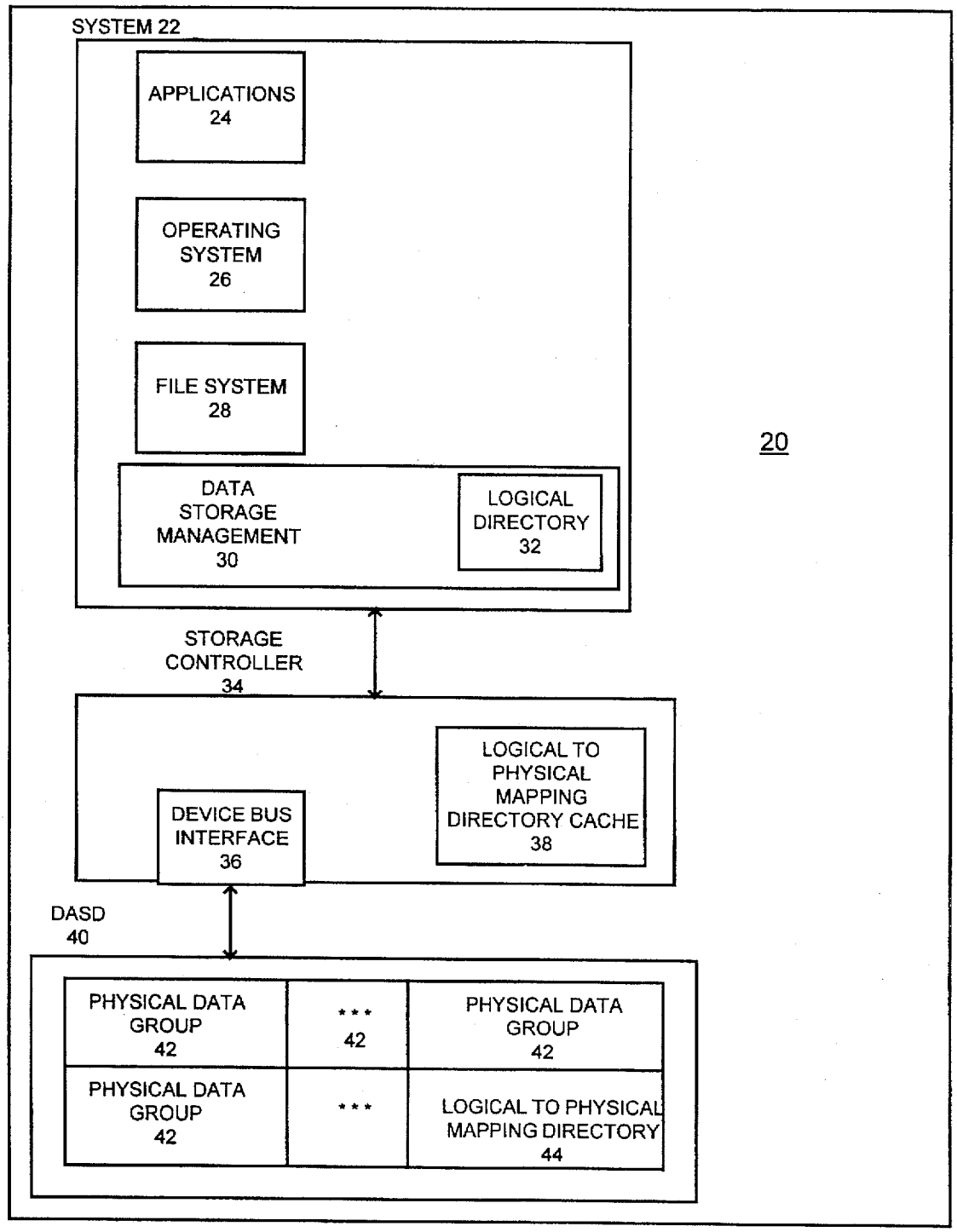
FIG. 1 is a block diagram illustrating a computer system employing a storage controller for implementing an adaptive localization method for frequently accessed, randomly addressed data in a direct access storage device (DASD) using fixed block architecture in accordance with the present invention.

Referring now to the drawings, in FIG. 1 there is illustrated a block diagram representation of an exemplary computer system generally designated by 20 for performing methods for adaptive localization of frequently accessed, randomly addressed data of the invention. As illustrated, the exemplary system 20 includes a data processing or host system generally designated by 22. Host system 22 includes a plurality of applications 24, an operating system 26, a file system 28, and a direct access storage device (DASD) data storage management function 30 used to store data onto at least one DASD 40. DASD storage management function 30 includes a logical directory 32 that stores the logical block addresses where data is placed on an associated DASD or DASDs 40.

Data is accessed on the DASD 40 through a storage controller generally designated by 34. Storage controller 34 includes a device bus interface 36 for connection to DASD 40 and a logical to physical mapping directory cache 38 that is used for storing cache directory elements of a DASD logical to physical mapping directory 44 generated within the storage controller 34. Data is passed to or received from the DASD 40 via the device bus interface 36. DASD 40 includes a plurality of physical data groups 42 and the logical to physical mapping directory 44 for locating data in the DASD physical data groups. Various commercially available computer systems can be used for implementing the adaptive data localization method and computer system 22, for example, an IBM AS/400 computer.

In accordance with features of the invention, improved system access performance is achieved by adaptive localization of frequently accessed, randomly addressed data over time in the DASD 40. At selected sampling intervals, storage controller 34 analyzes data access patterns based on frequency of access, identifies a remapping algorithm to remap the logical groups to physical groups, and moves the physical groups according to the identified remapping algorithm. The reordering and remapping of the data on the DASD 40 provides frequently accessed data in close proximity so that seek time is minimized. The adaptive data localization method periodically performed by the storage controller 34 is made transparent to or hidden from the file system 28. The reordering of the data on the DASD 40 is performed during periods of low system utilization or low system data transfer activity.

Figure 2A:
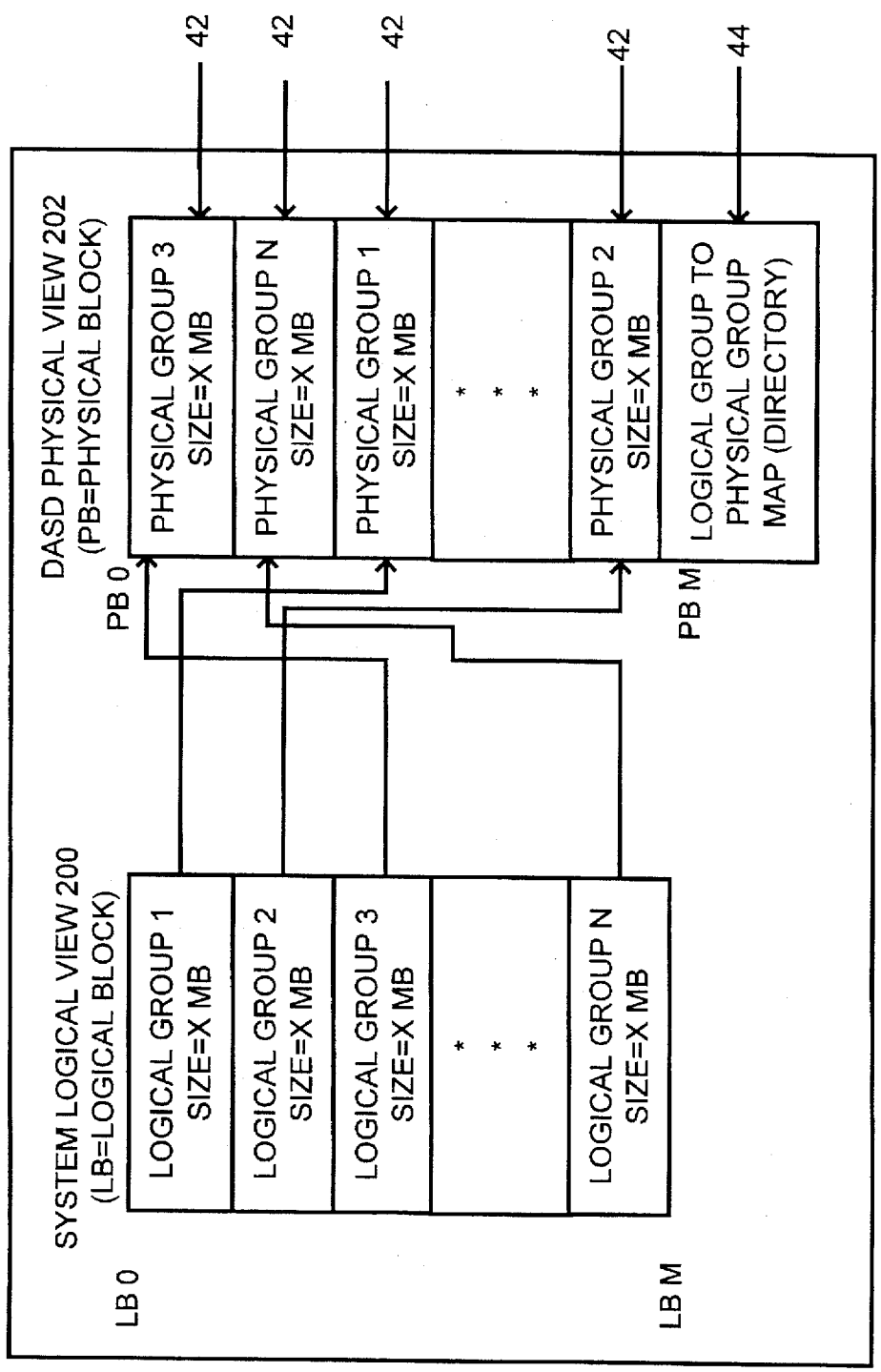
FIG. 2A is a block diagram illustrating an example of block address mapping from the system logical view to the DASD physical view in accordance with the present invention.

Having reference now to FIG. 2A, an example block address mapping from the system logical view to the DASD physical view is illustrated. As illustrated, storage controller 34 presents a SYSTEM LOGICAL VIEW 200 consisting of a contiguous logical block address space, logical groups 1 through N of a selected size X MB, and a count of the number of blocks on the DASD, LB 0 through LB M to the system 22. The system 22 accesses data within this logical address space as if it was a real physical DASD with sequentially ordered logical blocks. Storage controller 34 divides the system logical block address space into logical groups of contiguous addresses and then maps the system logical address space to a DASD PHYSICAL VIEW 202 including physical groups 1 through N of equal size X MB and physical blocks PB 0 through PB M. Storage controller 34 stores the mapping directory 44 on DASD 40. A subset of the mapping directory 44 resides in the storage controller cache 38. Storage controller 34 monitors and records system accesses of data stored in the individual logical groups. Storage controller 34 chooses a localization point 300 (FIGS. 3A–3I) in the physical DASD address space where frequently accessed data is localized or clustered around. The localization point 300 can be selectively provided anywhere in a physical address space of DASD 40.

Figure 2B:
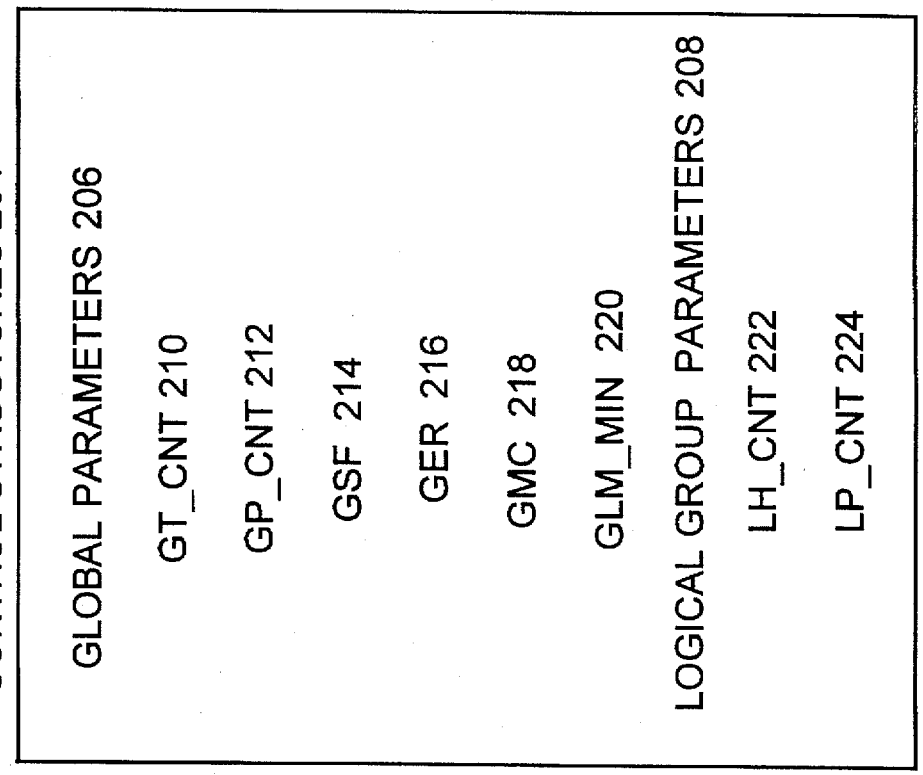
FIG. 2B is a block diagram illustrating control structures used by a storage controller of FIG. 1 for the adaptive localization method for frequently accessed, randomly addressed data in accordance with the present invention.

Having reference now to FIG. 2B, there are control structures 204 used by a storage controller 34 for the adaptive localization method of the present invention. The control structures include global parameters 206 and logical group parameters 208. The global control parameters include a number of accesses that constitute a sampling interval GT_CNT (GLOBAL PERIOD THRESHOLD COUNT) 210; a total number of accesses to all Logical Groups in the current sampling interval GP_(GLOBAL PERIOD ACCESS COUNT) 212; a linear or non-linear weighting between historical access activity and period access activity when determining rate of progression to localization point GSF (GLOBAL SCALING FACTOR) 214; a linear or non-linear derating applied to historical access activity when determining rate of regression from the localization point GER (GLOBAL EXILE RATE) 216; a maximum number of logical groups that can be moved to new physical groups at any reordering time GMC (GLOBAL MOVEMENT COUNT) 218; and a minimum number of physical groups where a logical group can be moved at any reordering GLM_MIN (GLOBAL LOGICAL GROUP MOVEMENT MINIMUM) 220. The minimum number of physical groups where a logical group can be moved GLM_MIN 220 is provided to avoid thrashing or excessive data movement during reordering. The maximum number of logical groups that can be moved to new physical groups at any reordering time GMC 218 and the minimum number of physical groups where a logical group can be moved at any reordering GLM_MIN 220 are used to facilitate a slow, steady progression to an optimum logical to physical mapping for DASD 40 over time. The logical group parameters 208 include a count representation of historical access activity to this Logical Group LH_CNT (LOGICAL GROUP HISTORICAL ACCESS COUNT) 222; and a total number of accesses to this Logical Group in the current sampling interval LP_CNT (LOGICAL GROUP PERIOD ACCESS COUNT) 224.

Figure 3A:
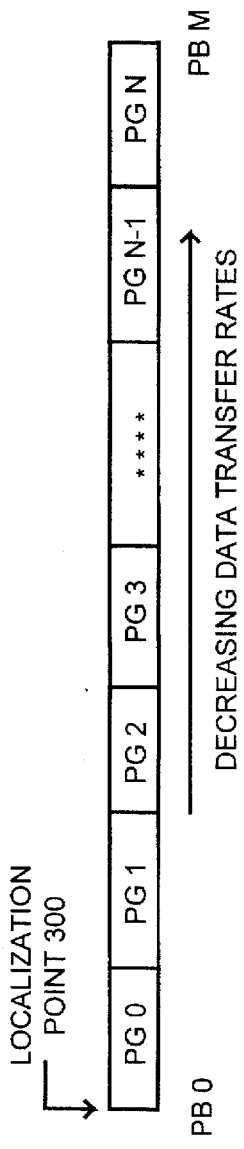
FIGS. 3A–3C are block diagram illustrating alternative selections of a localization point in a direct access storage device (DASD) physical address space selected by a storage controller of FIG. 1 in accordance with the present invention.
Figure 3B:
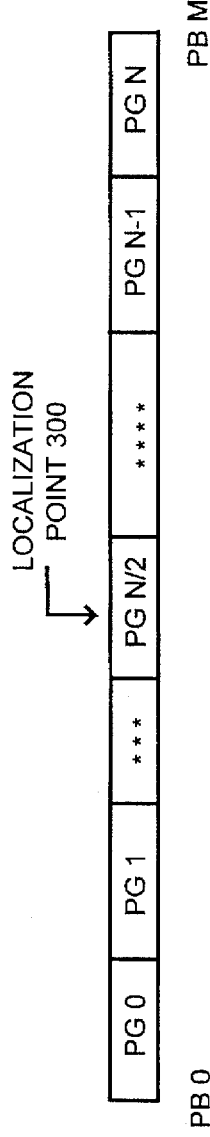
Figure 3C:
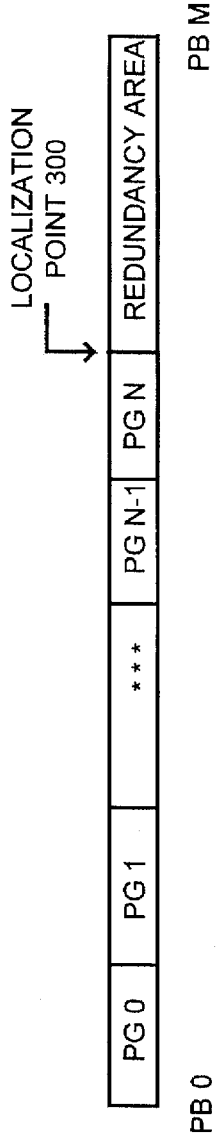

Referring to FIGS. 3A, 3B and 3C, there are shown exemplary alternative selections for the localization point 300 in a direct access storage device (DASD) physical address space selected by a storage controller 34 in accordance with the present invention. In FIG. 3A, the localization point 300 is provided at a physical location labeled PB0 where the data transfer rate is the fastest and may decrease the further away one moves in the address space. The selected localization point 300 where the data transfer rate is fastest may be selected by the storage controller 34 for engineering and scientific and other applications processing large amounts of data. In FIG. 33, the localization point 300 is provided at the middle of the physical address space labeled PG N/2 to allow access frequency banding on both sides of the localization point 300. The central localization point 300 of FIG. 3B may be selected by the storage controller 34 for transactional applications for processing, for example, catalog sales. In FIG. 3C, the localization point 300 is provided adjacent to some function specific boundary, such as data redundancy area as shown or a reserved area, which is frequently accessed by the storage controller 34. The function specific boundary localization point 300 may be selected by the storage controller 34 for applications where the storage controller 34 maintains data redundancy on DASD 40, such as a redundant array of independent disks (RAID).

FIGS. 3D–3I illustrate resulting localized DASD data from alternative DASD remapping algorithms selected by a storage controller 34 with the adaptive localization methods for frequently accessed, randomly addressed data of the invention. In FIG. 3D, a selected remapping algorithm is used to move the most frequently accessed data closest to the localization point and least frequently accessed data further away from the localization point.

In FIG. 3E, a selected remapping algorithm is used to move logical groups that show relationships between references to each logical group adjacent to each other or locality of reference. In FIG. 3E, PG Y and PG Y+1 are accessed together and PG X, PG X+1, and PG X+2 are accessed together, so that these respective logical groups are moved adjacent to each other.

Figure 3F:
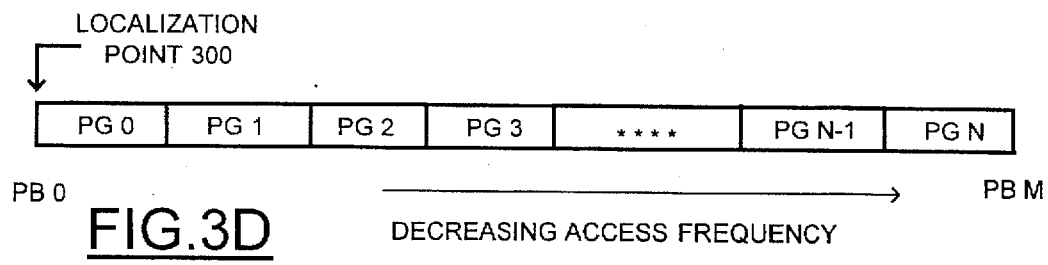
Figure 3F:
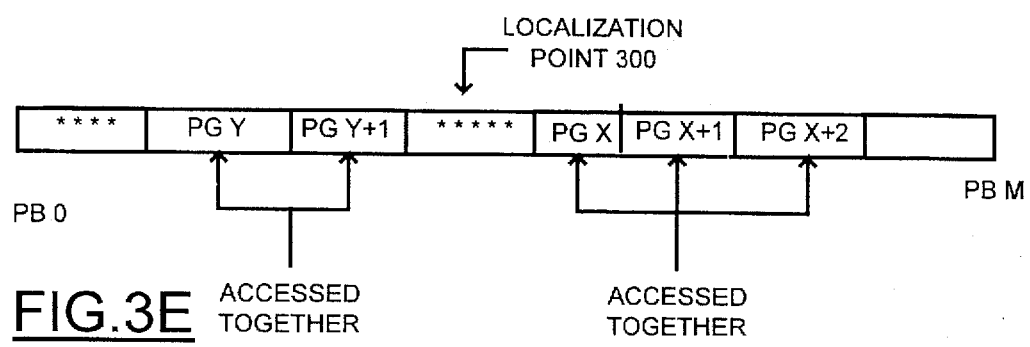
Figure 3F:
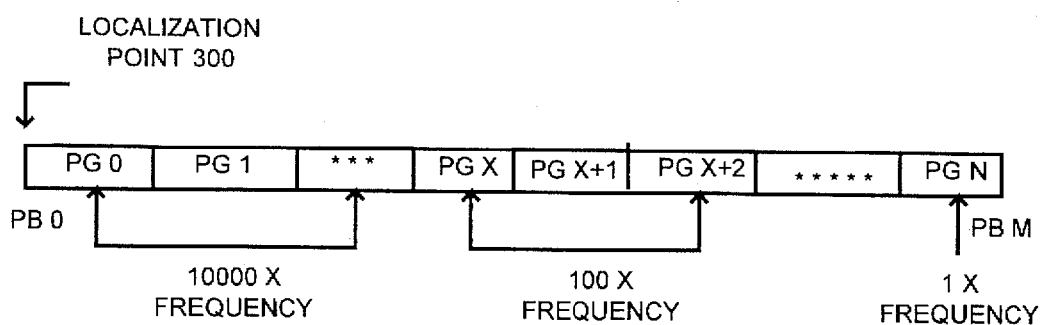

In FIG. 3F, a selected remapping algorithm is used to separate data into clusters of logical groups labeled 1000× FREQUENCY, 100×FREQUENCY, and 1×FREQUENCY, which vary in magnitude of access frequency or logarithmic banding. Groups within each logarithmic band may or may not be ordered linearly by access frequency.

Figure 3G:
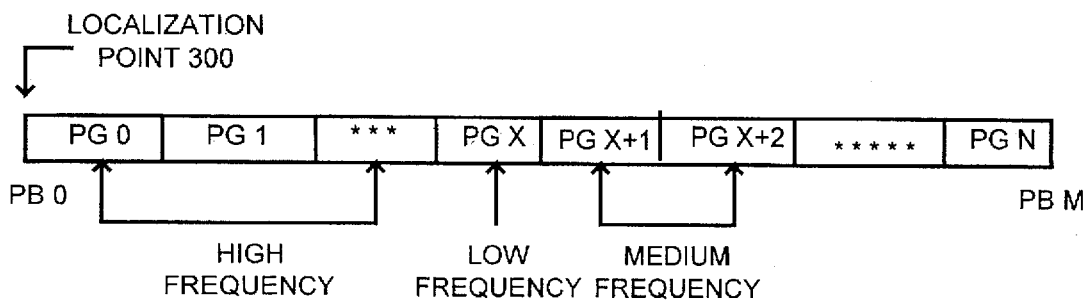

In FIG. 3G, a selected remapping algorithm is used to insert extremely infrequently or non-accessed logical groups labeled LOW FREQUENCY between clusters of frequently accessed groups or bands labeled HIGH FREQUENCY, AND MEDIUM FREQUENCY to allow faster moving or "swapping in" of groups in the future which begin to exhibit higher frequency of access. Also free space can be provided within the clusters of HIGH FREQUENCY, AND MEDIUM FREQUENCY groups for faster data movement within the groups.

Figure 3H:
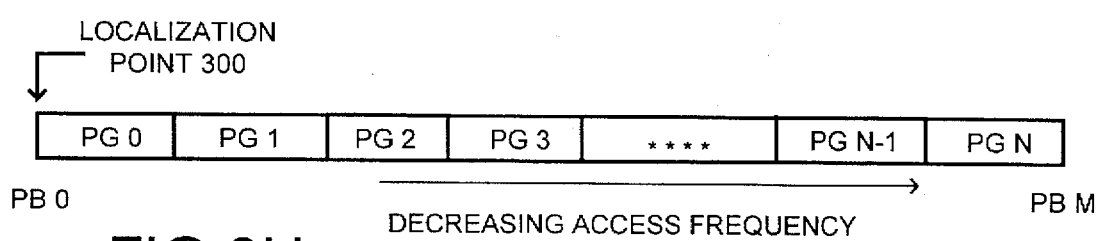

In FIG. 3H, a selected remapping algorithm is used to pack the most frequently used groups in a continuum with no space in between to get the fastest accesses at a given time.

Figure 3I:
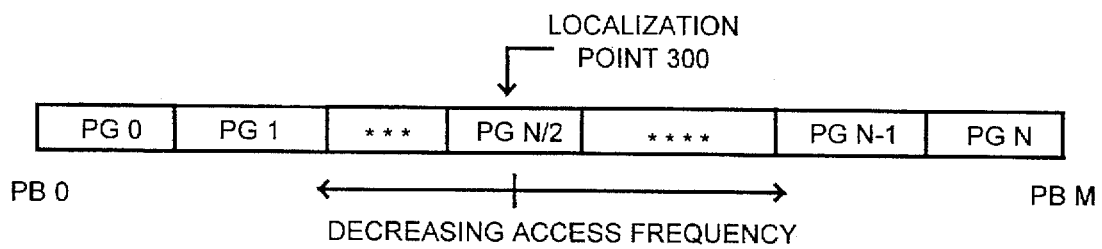

In FIG. 3I, a selected remapping algorithm is used to alternate the most frequently accessed groups on either side of the localization point 300 with access frequency decreasing in each direction.

Figure 4:
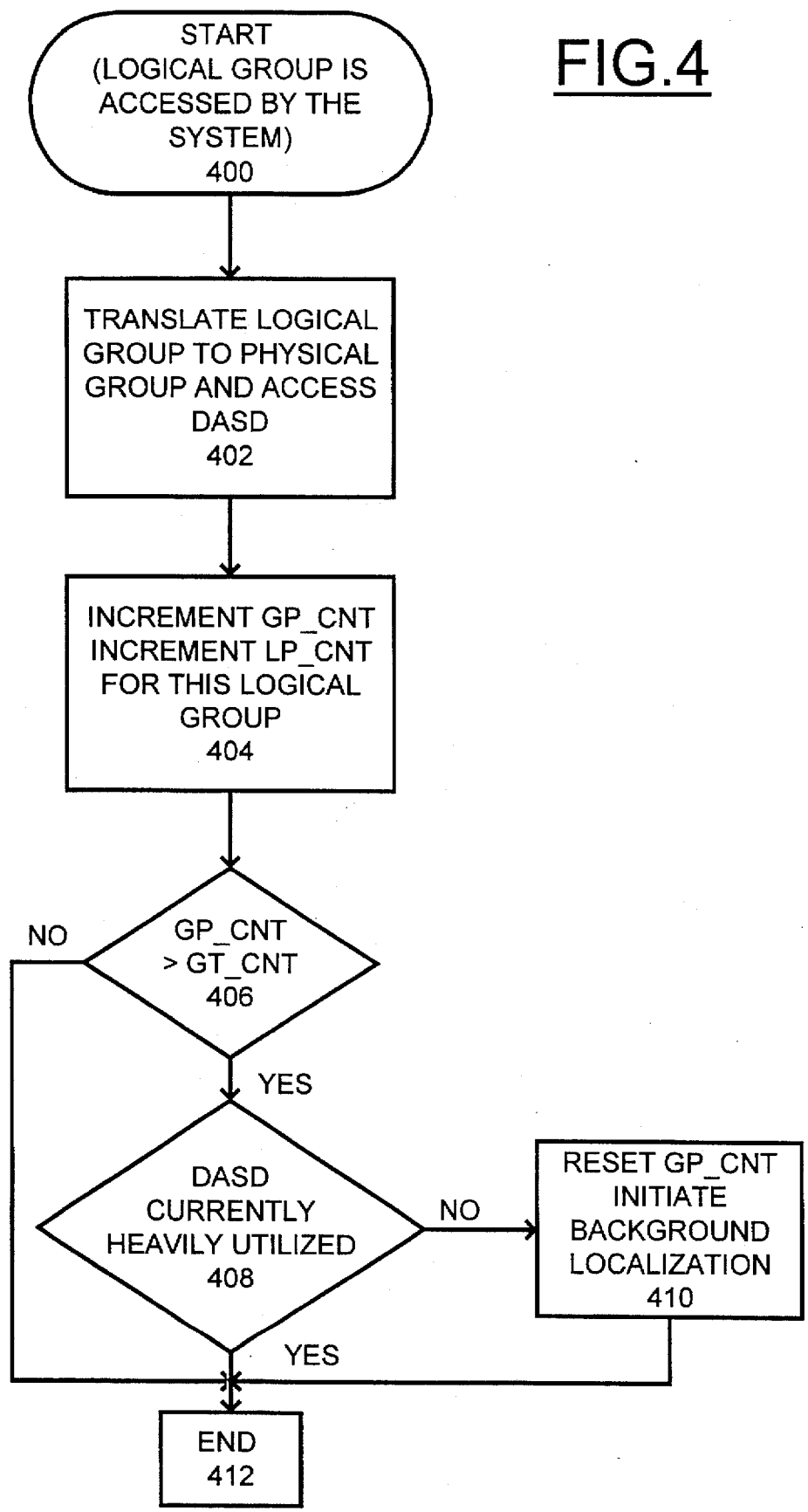
FIGS. 4–5 are flow charts illustrating logical steps performed by a storage controller of the computer system of FIG. 1 in accordance with the present invention.

Referring now to FIG. 4, there are shown sequential steps performed by storage controller 34 with logic group accesses by system 22. The sequential steps begin as indicated at a block 400 when a logical group is accessed by the system 22. Storage controller 34 translates the logical group to physical group and accesses the physical group as indicated at a block 402. Storage controller 34 increments the global period access count GP_CNT for the current sampling interval and increments the logical group period access count as indicated at a block 404. Storage controller 34 compares the global period access count GP_CNT with the global period threshold count GT_CNT as indicated at a decision block 406. When the global period access count GP_CNT is greater than the global period threshold count GT_CNT, then storage controller 34 determines whether the DASD 40 is currently heavily utilized as indicated at a decision block 408. When the DASD 40 is not currently heavily utilized or has a low data transfer activity, then storage controller 34 resets the global period access count GP_CNT and initiates background localization as indicated at a block 410 to initiate the background function at block 500 in FIG. 5. Otherwise, when the DASD 40 is currently heavily utilized, the logical group access ends as indicated at a block 412 without resetting the global period access count GP_CNT and initiating background localization. Otherwise, when the global period access count GP_CNT is less than or equal to the global period threshold count GT_CNT, then the logical group access ends at block 412.

Figure 5:
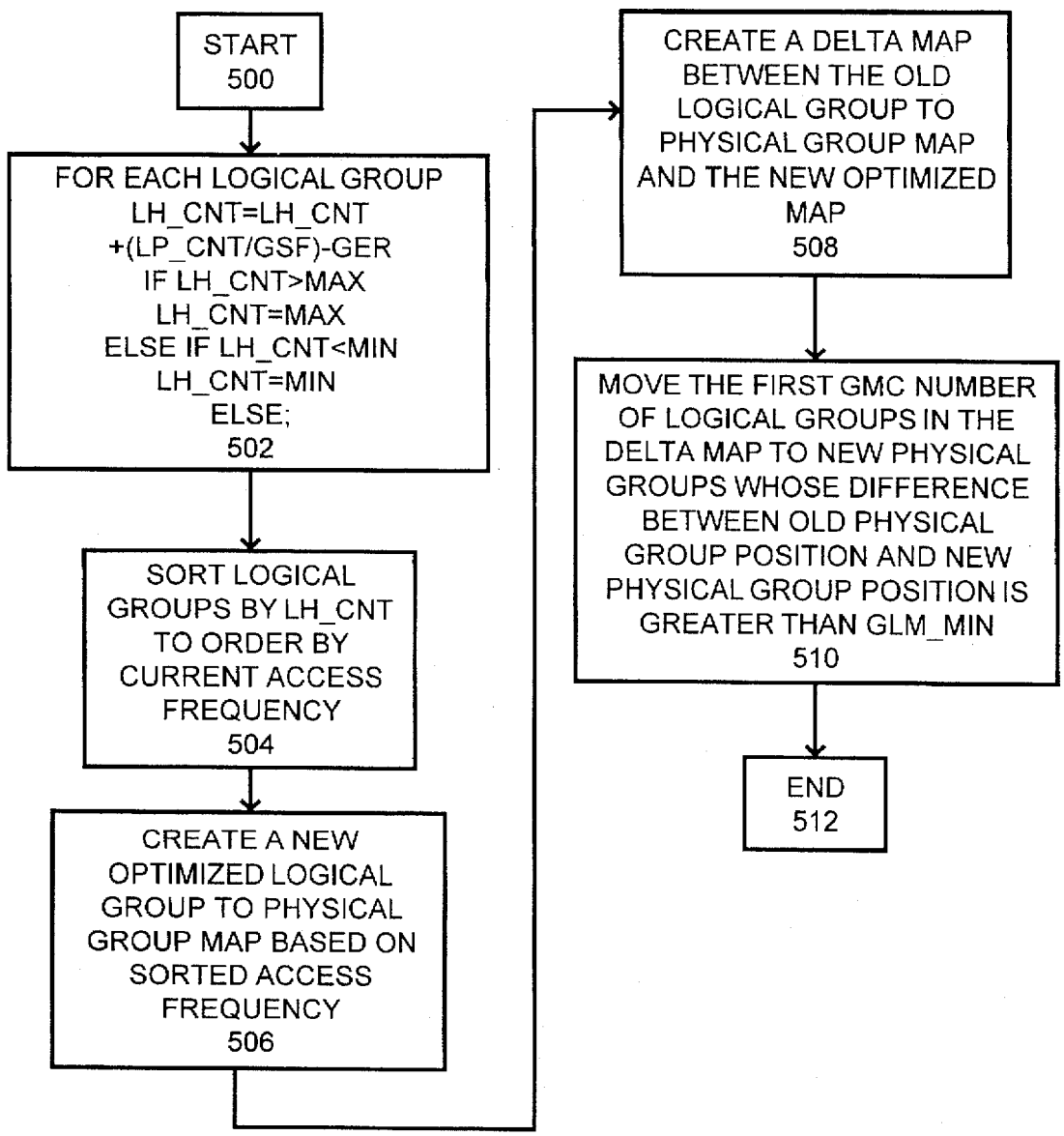

Referring to FIG. 5, there are shown exemplary logical steps performed by storage controller 34 of the method for adaptive localization of frequently accessed, randomly addressed data of the invention. The sequential steps begin at block 500. First for each logical group, the LH_CNT or the logical group historical access count is updated by adding (LP_CNT/GSF) or the logical group period access count divided by the global scaling factor for progression toward localization point 300 and subtracting GER or the global exile rate for regression away from the localization point 300 as indicated at a block 502. Then as indicated at a block 502, the resulting LH_CNT is compared with minimum and maximum limits to avoid counter overflow. If the LH_CNT is greater than max, the LH_CNT is set to max. Else if the LH_CNT is less than min, the LH_CNT is set to min at block 502. Next the logical groups are sorted by LH_CNT to order the logical groups by the current access frequency as indicated at a block 504. Then a new optimized logical group to physical group map is created based on the sorted access frequency as indicated at a block 506. A delta map is created between the old logical group to physical group map and the new optimized logic group to physical group map as indicated at a block 508. The delta map created at block 508 is ordered by the amount of change between the old physical group position and the new optimized physical group position. Storage controller 34 moves the first global movement count GMC number of logical groups in the delta map to new physical groups where the difference between the old physical group position and the new physical group position is greater than GLM_MIN as indicated at a block 510. This completes the localization process with the sequential steps ending at block 512.

Figure 6:
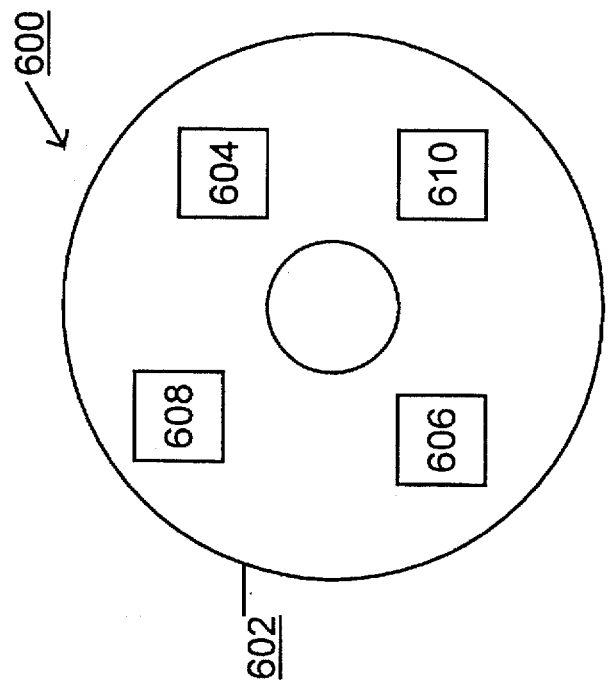
FIG. 6 is a block diagram illustrating a computer program product in accordance with the invention.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, a solid state DASD comprised of a fast expensive primary store and a slower less expensive backing store, a transmission type media such as a digital or analog communications link, or a similar computer program product. Recording medium 602 stores program means 604, 606, 608, 610 on the medium 602 for carrying out the methods of this invention by storage controller 34 in the system 20 of FIG. 1.

A sequence of program instructions or a logical assembly of one or more interrelated modules defined by the recorded program means 604, 606, 608, 610, direct the storage controller 34 to perform methods for adaptive localization of frequently accessed, randomly addressed data of the invention.

While the present invention has been described with reference to the details of the embodiments of the invention shown in the drawing, these details are not intended to limit the scope of the invention as claimed in the appended claims.

What is claimed is:

1. A method for adaptive localization of frequently accessed, randomly addressed data in a direct access storage device (DASD) comprising the steps of:

identifying frequency of access to a plurality of logical groups during a sampling interval; said logical groups being mapped to physical groups in the direct access storage device (DASD);

selecting a localization point in the direct access storage device (DASD);

sorting the plurality of logical groups based on the identified frequency of access;

creating a new optimized logical group to physical group map based on the sorted plurality of logical groups;

creating a delta map between a current logical group to physical group map and the new optimized logical group to physical group map; and moving a number of logical groups in the delta map to new physical groups.

2. A method for adaptive localization of frequently accessed, randomly addressed data as recited in claim 1 wherein said step of selecting said localization point in the direct access storage device (DASD) includes the step of selecting a physical location in the DASD where a data transfer rate is a maximum value.

3. A method for adaptive localization of frequently accessed, randomly addressed data as recited in claim 1 wherein said step of selecting said localization point in the direct access storage device (DASD) includes the step of selecting a middle physical location in the DASD physical address space.

4. A method for adaptive localization of frequently accessed, randomly addressed data as recited in claim 1 wherein said step of selecting said localization point in the direct access storage device (DASD) includes the step of selecting a function specific boundary in the DASD physical address space; said function specific boundary being located adjacent a frequently accessed area in the DASD physical address space.

5. A method for adaptive localization of frequently accessed, randomly addressed data as recited in claim 1 further includes the step of identifying a low DASD data transfer activity level; and wherein said step of sorting the plurality of logical groups based on the identified frequency of access is responsive to said identified low DASD data transfer activity level.

6. A method for adaptive localization of frequently accessed, randomly addressed data as recited in claim 1 wherein said step of creating the new optimized logical group to physical group map based on the sorted plurality of logical groups includes the steps of locating most frequently accessed data closest to the selected localization point and least frequently accessed data further away from the selected localization point.

7. A method for adaptive localization of frequently accessed, randomly addressed data as recited in claim 1 wherein said step of creating the new optimized logical group to physical group map based on the sorted plurality of logical groups includes the step of separating data into clusters of logical groups which vary in magnitude of access frequency.

8. A method for adaptive localization of frequently accessed, randomly addressed data as recited in claim 7 further includes the step of inserting free space between said clusters of logical groups which vary in magnitude of access frequency.

9. A method for adaptive localization of frequently accessed, randomly addressed data as recited in claim 7 wherein said step of separating data into clusters of logical groups which vary in magnitude of access frequency includes packing said clusters of logical groups in a continuum without free space between said clusters.

10. A method for adaptive localization of frequently accessed, randomly addressed data as recited in claim 1 wherein said step of creating the new optimized logical group to physical group map based on the sorted plurality of logical groups includes the step of locating most frequently accessed data on both sides of said localization point, and locating less frequently accessed data on both sides of said localization point further away from said localization point.

11. A method for adaptive localization of frequently accessed, randomly addressed data as recited in claim 1 wherein said step of identifying frequency of access to a plurality of logical groups during a sampling interval includes the step of applying a weighting factor for historical access activity and the current sampling interval.

12. Apparatus for adaptive localization of frequently accessed, randomly addressed data in a direct access storage device (DASD) comprising:

means for identifying frequency of access to a plurality of logical groups during a sampling interval; said logical groups being mapped to physical groups in the direct access storage device (DASD);

means for selecting a localization point in the direct access storage device (DASD);

means for sorting the plurality of logical groups based on the identified frequency of access;

means for creating a new optimized logical group to physical group map based on the sorted plurality of logical groups;

means for creating a delta map between a current logical group to physical group map and the new optimized logical group to physical group map; and means for moving a number of logical groups in the delta map to new physical groups.

13. Apparatus for adaptive localization of frequently accessed, randomly addressed data as recited in claim 12 wherein said means for selecting said localization point in the direct access storage device (DASD) includes means for selecting a physical location in the DASD where a data transfer rate is a maximum value.

14. Apparatus for adaptive localization of frequently accessed, randomly addressed data as recited in claim 12 wherein said means for selecting said localization point in the direct access storage device (DASD) includes means for selecting a middle physical location in the DASD physical address space.

15. Apparatus for adaptive localization of frequently accessed, randomly addressed data as recited in claim 12 wherein said means for selecting said localization point in the direct access storage device (DASD) includes means for selecting a function specific boundary in the DASD physical address space; said function specific boundary being located adjacent a frequently accessed area in the DASD physical address space.

16. Apparatus for adaptive localization of frequently accessed, randomly addressed data as recited in claim 12 further includes means for identifying a low DASD data transfer activity level; and wherein said means for sorting the plurality of logical groups based on the identified frequency of access is responsive to said identified low DASD data transfer activity level.

17. Apparatus for adaptive localization of frequently accessed, randomly addressed data as recited in claim 12 wherein said means for creating the new optimized logical group to physical group map based on the sorted plurality of logical groups includes means for locating most frequently accessed data closest to the selected localization point and for locating least frequently accessed data further away from the selected localization point.

18. Apparatus for adaptive localization of frequently accessed, randomly addressed data as recited in claim 12 wherein said means for creating the new optimized logical group to physical group map based on the sorted plurality of logical groups includes means for separating data into clusters of logical groups which vary in magnitude of access frequency.

19. Apparatus for adaptive localization of frequently accessed, randomly addressed data as recited in claim 12 wherein said means for creating the new optimized logical group to physical group map based on the sorted plurality of logical groups include means for locating most frequently accessed data on both sides of said localization point, and for locating less frequently accessed data on both sides of said localization point further away from said localization point.

20. Apparatus for adaptive localization of frequently accessed, randomly addressed data as recited in claim 12 wherein said means for identifying frequency of access to a plurality of logical groups during a sampling interval includes means for applying a weighting factor for historical access activity and the current sampling interval.

21. A computer program product for use in a computer system having a storage processor for adaptive localizing frequently accessed, randomly addressed data in a direct access storage device (DASD), the computer program product comprising:

a recording medium;

means, recorded on the recording medium, for identifying frequency of access to a plurality of logical groups during a sampling interval; said logical groups being mapped to physical groups in the direct access storage device (DASD);

means, recorded on the recording medium, for selecting a localization point in the direct access storage device (DASD);

means, recorded on the recording medium, for sorting the plurality of logical groups based on the identified frequency of access;

means, recorded on the recording medium, for creating a new optimized logical group to physical group map based on the sorted plurality of logical groups;

means, recorded on the recording medium, for creating a delta map between a current logical group to physical group map and the new optimized logical group to physical group map; and means, recorded on the recording medium, for moving a number of logical groups in the delta map to new physical groups.

22. A computer program product for adaptive localization of frequently accessed, randomly addressed data as recited in claim 21 wherein said means, recorded on the recording medium, for moving said number of logical groups in the delta map to said new physical groups includes means for identifying a minimum number of physical groups greater than a threshold position difference for moving a logical group.

* * * * *